(12) United States Patent
Finlaw

(10) Patent No.: US 9,864,959 B2
(45) Date of Patent: *Jan. 9, 2018

(54) PROVIDING GEOGRAPHICALLY RELEVANT WEBSITE CONTENT

(71) Applicant: BOOKIT OPERATING LLC, Panama City Beach, FL (US)

(72) Inventor: Arthur P. Finlaw, Panama City Beach, FL (US)

(73) Assignee: BOOKIT OPERATING LLC, Panama City Beach, FL (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/662,646

(22) Filed: Mar. 19, 2015

(65) Prior Publication Data

US 2015/0193704 A1 Jul. 9, 2015

Related U.S. Application Data

(60) Continuation of application No. 13/894,166, filed on May 14, 2013, now Pat. No. 9,021,058, which is a (Continued)

(51) Int. Cl.
*G06F 15/16* (2006.01)
*G06Q 10/02* (2012.01)
(Continued)

(52) U.S. Cl.
CPC ..... *G06Q 10/025* (2013.01); *G06F 17/30867* (2013.01); *G06Q 30/0625* (2013.01);
(Continued)

(58) Field of Classification Search
CPC .......... G06Q 30/205; G06Q 30/0261
(Continued)

(56) References Cited

U.S. PATENT DOCUMENTS 5,948,040 A * 9/1999 DeLorme ............... G01C 21/36
340/990
7,711,587 B2 5/2010 De Marcken
(Continued)

OTHER PUBLICATIONS

United Airlines. Flight Route Map 2003. p. 1.

*Primary Examiner* — Imad Hussain
(74) *Attorney, Agent, or Firm* — Akerman LLP; Peter A. Chiabotti

(57) ABSTRACT

A method, system and computer-readable device for presenting geographically relevant content are provided. They can include reading a remote internet protocol address of a user computing device based on an initial request for content from the user computer device, determining a primary home airport based on the internet protocol address of the user computing device and searching a database for an available flight and hotel package having a flight originating at the primary home airport. They can also include identifying a preferred flight and hotel package from among a plurality of available flight and hotel packages having flights originating at the primary home airport by eliminating travel packages from among the plurality of available flight and hotel packages that have destinations unlikely to be popular for a particular geographic region associated with the internet protocol address.

20 Claims, 3 Drawing Sheets

Related U.S. Application Data continuation of application No. 13/242,956, filed on Sep. 23, 2011, now Pat. No. 8,443,053, which is a continuation of application No. 12/792,587, filed on Jun. 2, 2010, now abandoned, which is a division of application No. 12/041,430, filed on Mar. 3, 2008, now Pat. No. 8,010,628.

(51) Int. Cl.
| | |
|---|---|
| H04W 4/02 | (2009.01) |
| G06Q 30/06 | (2012.01) |
| G06Q 50/12 | (2012.01) |
| G06Q 50/30 | (2012.01) |
| H04L 29/08 | (2006.01) |
| G06F 17/30 | (2006.01) |

(52) U.S. Cl.
CPC ............ *G06Q 50/12* (2013.01); *G06Q 50/30* (2013.01); *H04L 67/02* (2013.01); *H04L 67/18* (2013.01); *H04W 4/02* (2013.01)

(58) Field of Classification Search
USPC .................................. 709/217, 218
See application file for complete search history.

(56) References Cited

U.S. PATENT DOCUMENTS

| | | | | |
|---|---|---|---|---|
| 2001/0042023 A1* | 11/2001 | Anderson | ............. | G06Q 30/06 705/26.2 |
| 2002/0095256 A1* | 7/2002 | Jones | ............. | G06Q 30/06 701/532 |
| 2003/0036949 A1* | 2/2003 | Kaddeche | ............. | G06Q 30/02 705/14.39 |
| 2003/0212594 A1* | 11/2003 | Hogan | ............. | G06F 17/30867 705/14.49 |
| 2004/0078252 A1* | 4/2004 | Daughtrey | ........ | G06F 17/30398 705/5 |
| 2004/0199623 A1* | 10/2004 | Houri | ............. | H04L 29/06 709/223 |
| 2005/0050097 A1* | 3/2005 | Yeh | ............. | G06F 17/3087 |
| 2005/0071417 A1* | 3/2005 | Taylor | ............. | G06Q 30/02 709/200 |
| 2005/0086087 A1* | 4/2005 | Razza | ............. | G06Q 10/025 705/5 |
| 2006/0259234 A1* | 11/2006 | Flynn | ............. | G08G 5/0034 701/528 |
| 2006/0259357 A1* | 11/2006 | Chiu | ............. | G06Q 30/02 705/14.53 |
| 2007/0100867 A1* | 5/2007 | Celik | ............. | G06Q 30/02 |
| 2007/0161382 A1* | 7/2007 | Melinger | ............. | H04L 67/18 455/456.1 |
| 2007/0260495 A1* | 11/2007 | Mace | ............. | G06Q 10/02 705/5 |
| 2008/0037536 A1* | 2/2008 | Padmanabhan | ......... | H04L 45/04 370/389 |
| 2008/0065480 A1* | 3/2008 | Baker | ............. | G06Q 30/02 705/14.54 |
| 2008/0072064 A1* | 3/2008 | Franchi | ............. | G06F 21/32 713/186 |
| 2008/0086368 A1* | 4/2008 | Bauman | ............. | G06Q 30/02 705/7.34 |
| 2008/0091482 A1* | 4/2008 | Whitsett | ............. | G06Q 10/025 705/6 |
| 2008/0120542 A1* | 5/2008 | Westphal | ............. | G06F 17/3087 715/273 |
| 2008/0140476 A1* | 6/2008 | Anand | ............. | G06Q 30/02 705/14.43 |
| 2008/0140525 A1* | 6/2008 | Lamsfuss | ............. | G06Q 30/02 705/14.54 |
| 2008/0140542 A1* | 6/2008 | Perron | ............. | G06Q 20/3224 705/27.1 |
| 2008/0154655 A1* | 6/2008 | Hartmann | .......... | G06Q 30/0601 705/5 |
| 2008/0167973 A1* | 7/2008 | De Marcken | ..... | G06F 17/30902 705/5 |
| 2008/0201220 A1* | 8/2008 | Broder | ............. | G06Q 30/02 705/14.56 |
| 2008/0208643 A1* | 8/2008 | Guastalla | ............. | G06Q 10/02 705/6 |
| 2008/0243822 A1* | 10/2008 | Campbell | .......... | G06F 17/3087 |
| 2008/0307053 A1* | 12/2008 | Mitnick | ............. | G06F 17/30241 709/205 |
| 2009/0006211 A1* | 1/2009 | Perry | ............. | G06Q 30/02 705/14.66 |
| 2009/0216577 A1* | 8/2009 | Killebrew | ............. | G06Q 30/02 705/7.32 |
| 2009/0281875 A1* | 11/2009 | Tarka | ............. | G06Q 10/02 705/5 |

\* cited by examiner

PROVIDING GEOGRAPHICALLY RELEVANT WEBSITE CONTENT

CROSS-REFERENCE TO RELATED APPLICATIONS

The present application is a continuation of U.S. patent application Ser. No. 13/894,166, filed May 14, 2013, which is a continuation of U.S. patent application Ser. No. 13/242,956, filed Sep. 23, 2011, now U.S. Pat. No. 8,443,053, which is a continuation of U.S. patent application Ser. No. 12/792,587, filed on Jun. 2, 2010, now abandoned, which is a divisional of U.S. patent application Ser. No. 12/041,430 filed on Mar. 3, 2008, now U.S. Pat. No. 8,010,628, all of which are hereby incorporated by reference in their entireties.

FIELD OF THE INVENTION

The present invention relates to computer software, and more particularly, to an internet website application that provides geographically relevant website content to a website visitor.

BACKGROUND

Several designs for delivering geographically relevant Internet content have been designed in the past. None of them, however, are known to include a passive means to identify where a discrete web page visitor is physically located and deliver at least some content relevant to that visitor's physical location.

Applicant believes that the closest reference corresponds to U.S. published patent application No. 2006/0190307 filed by Maxwell. However, it differs from the present invention because the present invention does not require that the web site visitor actively provide any information about the visitor's physical location but instead automatically attempts to determine where the web page visitor is physically located and then provide geographically relevant content based on a predetermined algorithm.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a means to determine where a web site visitor is physically located without any active input from that visitor and then deliver highly relevant dynamic web page content to a web site visitor based at least in part on the visitor's physical location.

It is still another object of the present invention to provide an anonymous environment where visitors of a web site can receive customized content based on their physical location.

It is yet another object of this invention to provide relevant content to a web site visitor quickly and without the need for a visitor to actively input any personal information.

It is another object of the present invention to deliver regionally relevant web page content to a web site visitor automatically based on the web site visitor's physical location.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
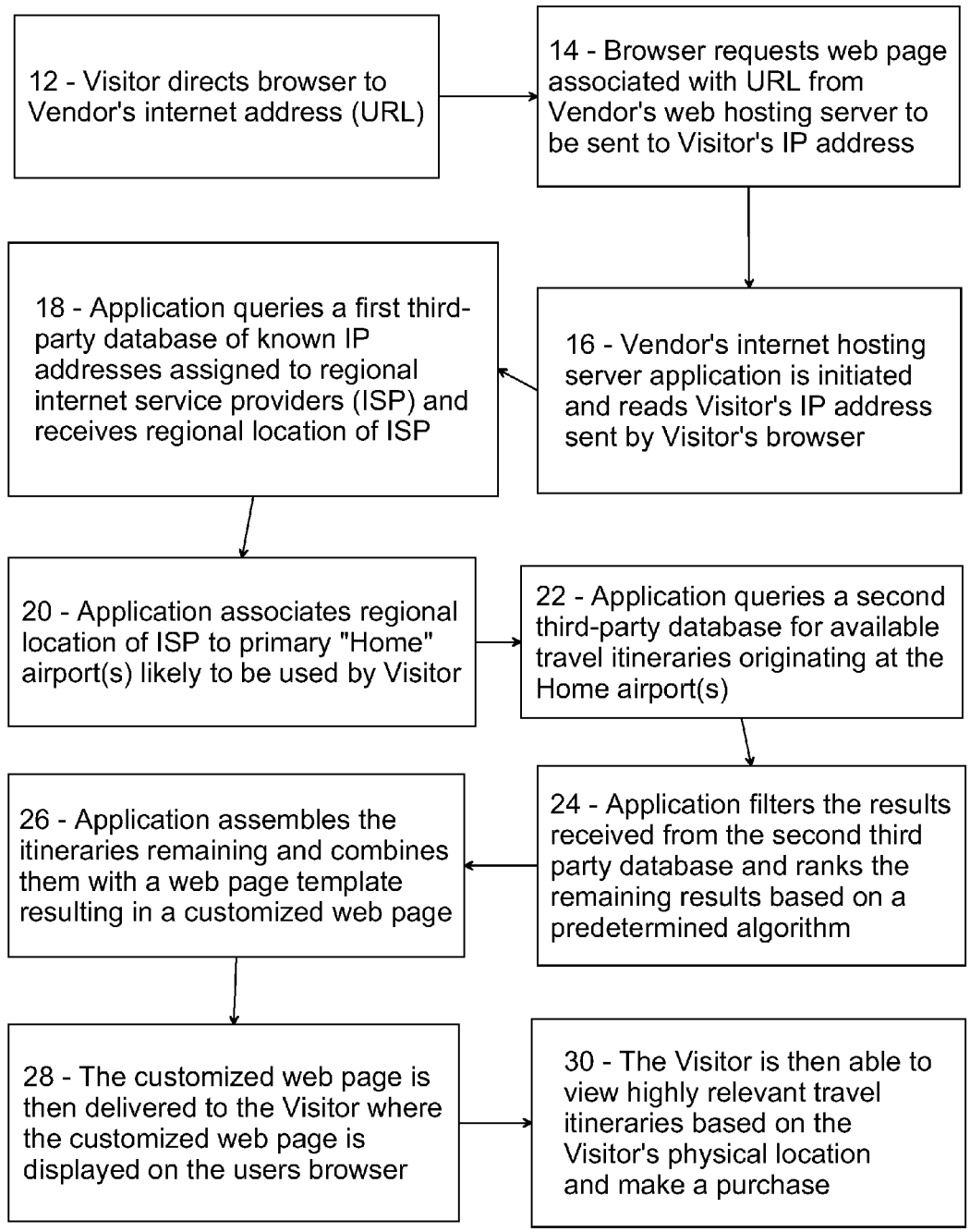
FIG. 1 represents a flow chart of software processes applied to a travel focused website.

Referring now to the drawings, where an embodiment of the present invention is generally demonstrated in FIG. 1 where the process begins at step 12 when a Visitor accesses the internet through their computer. The Visitor typically uses a browser in the Visitor's computer to view internet content graphically. The Visitor could use a common public search engine to locate a particular Vendor or search a class of vendors or the Visitor could manually type in a known internet address (uniform resource locator or URL) of a Vendor into their browser.

The Visitor's browser, as shown in step 14, sends a request directed to the Vendor's internet hosting server associated with the Vendor's URL for the return of the Vendor's website. The request includes the Visitor's unique internet protocol (IP) address so that the Vendor's internet hosting server can route a response to the request back to the specific Visitor's browser where the content can be viewed by the Visitor.

When the Visitor's request is received by the Vendor's internet hosting server the internet hosting server initiates a server-side software application as demonstrated in step 16. The software application reads the unique IP address of the Visitor and stores it into memory.

There are in existence and available to the public, sometimes as a fee based service, databases that catalog and index various information about internet service providers (ISP). Each ISP has a range of IP addresses that it assigns to its customers. Each ISP is also identified as servicing a specific region, for example a state, county or metropolitan area. Therefore, if an IP address is known the database can be searched to match the IP address to a likely physical location where the specific IP address is assigned based on the location of the ISP.

As shown in step 18 the application over the internet queries a first third-party database of IP addresses to match the IP address of the Visitor to an ISP. The ISP is typically reported as servicing a limited geographical area and therefore the likely physical location of the Visitor, based on the Visitor's IP address, is estimated.

In step 20 the application matches the Visitors location to one or more airports likely to be convenient to the Visitor and these are classified as preferred airports for that Visitor. In one embodiment the application has a predetermined set of, for example forty to eighty, primary airports from which the airport(s) convenient for a Visitor are selected. The airports are predetermined based on the likelihood of a traveler selecting that airport to initiate a flight and typically are either the busier airports or those airports servicing larger regions. The predetermined set of airports can be modified in the application as the needs of travelers or airports change.

An example of the results of the process in step 20 may be, for example, that a particular Visitor is estimated to be in the New York City area based on their IP address. The preferred airports may then be determined to be Newark International Airport, JFK International Airport or La Guardia Airport. In another example if the Visitor is estimated to be in Macon, Ga. the preferred airport may be Atlanta-Hartsfield in Atlanta, Ga.

After one or several preferred airports are determined the application queries a second third-party database as shown in step 22. The second third-party database is one or more of a commercially or publicly available database where airfares and other travel products are compiled and marketed. The application queries the second third-party database for the airfares and other travel products originating at the preferred airport(s) as determined in step 20.

In step 24 the airfare and other travel products are filtered and ranked based on a predetermined algorithm applied by the application. In one embodiment the filtering process is applied by the application to remove unlikely results returned from the query of the second third-party database. For example, the application algorithm may be set to filter out any itineraries with departure dates greater than three weeks in the future or those with fares greater than a set value. Another example may be where the application is set to filter out only those destinations with an average seasonal temperature of a predetermined value to limit the destinations to only those that have average winter temperatures warm enough to, for example, play golf or other activity.

The remaining travel products may then be ranked by the application. Certain destinations may be more popular for a particular region. For example, a Visitor in Los Angeles is much less likely to choose a Caribbean beach destination than a Mexican beach vacation whereas a visitors in Washington, D.C. often prefer a Florida beach vacation over Hawaii.

In an embodiment other criteria may also optionally be used to rank the travel products. For example, customer reviews, travel professional reviews or sales conversion rates may all have a predetermined weight when factoring a specific travel product's rank.

In an embodiment of the invention a web site cookie is placed on the Visitor's computer when they visit a Vendor's web site. The cookie may contain information related to, inter alia, what a Visitor viewed while on the Vendor's web site. Presumably, what a Visitor views is of particular interest to that Visitor. On subsequent visits to the Vendor's web site similar products are then ranked higher.

In an embodiment at step 24 the filter may rank results delivered to a Visitor based at least in part on what other Visitors of the web site in a similar geographical location viewed. Presumably, what other similarly located Visitors viewed may be of increased interest to other Visitors. This embodiment can track trends from day to day as to what Visitors from a particular location are interested.

As shown in step 26, after the application has filtered and ranked the travel products resulting in an ordered and refined set the information is formed into a customized, dynamic web page. A web page template may be pre-made with sections relevant to all regions of a greater area. For example, one United States web page template may be suitable for all regions in the United States. This is contrasted to a Canadian web page template that may be more suitable for Canadian visitors and in compliance with Canadian regulations or information of particular relevance to Canadian travelers. In general, a template may have a common navigation controls, themes and other common elements. Other areas of the web page template are reserved for dynamic, geographically relevant content.

To customize the web page to the specific individual Visitor the application merges the filtered and ranked travel products into a polished web page. The custom web page is delivered to the Visitor at step 28 without any further input from the Visitor and displayed on the Visitors browser where they are encouraged to make a purchase of the displayed travel products at step 30.

The entire progression from step 12 through step 30 occurs each time a Visitor directs her browser to the Vendor's website. Therefore the website displayed on a Visitor's browser will change as the information provided on the first third-party database or the second third-party database or as the algorithm is adjusted in the application. For example, if a Visitor visits the Vendor's website on one day and again on another day the webpage could be different because different travel products may have become available. In another example, a Visitor checking the Vendor's website at her home in Los Angeles may view a different webpage than what she viewed at her office in New York earlier that same day.

Figure 2:
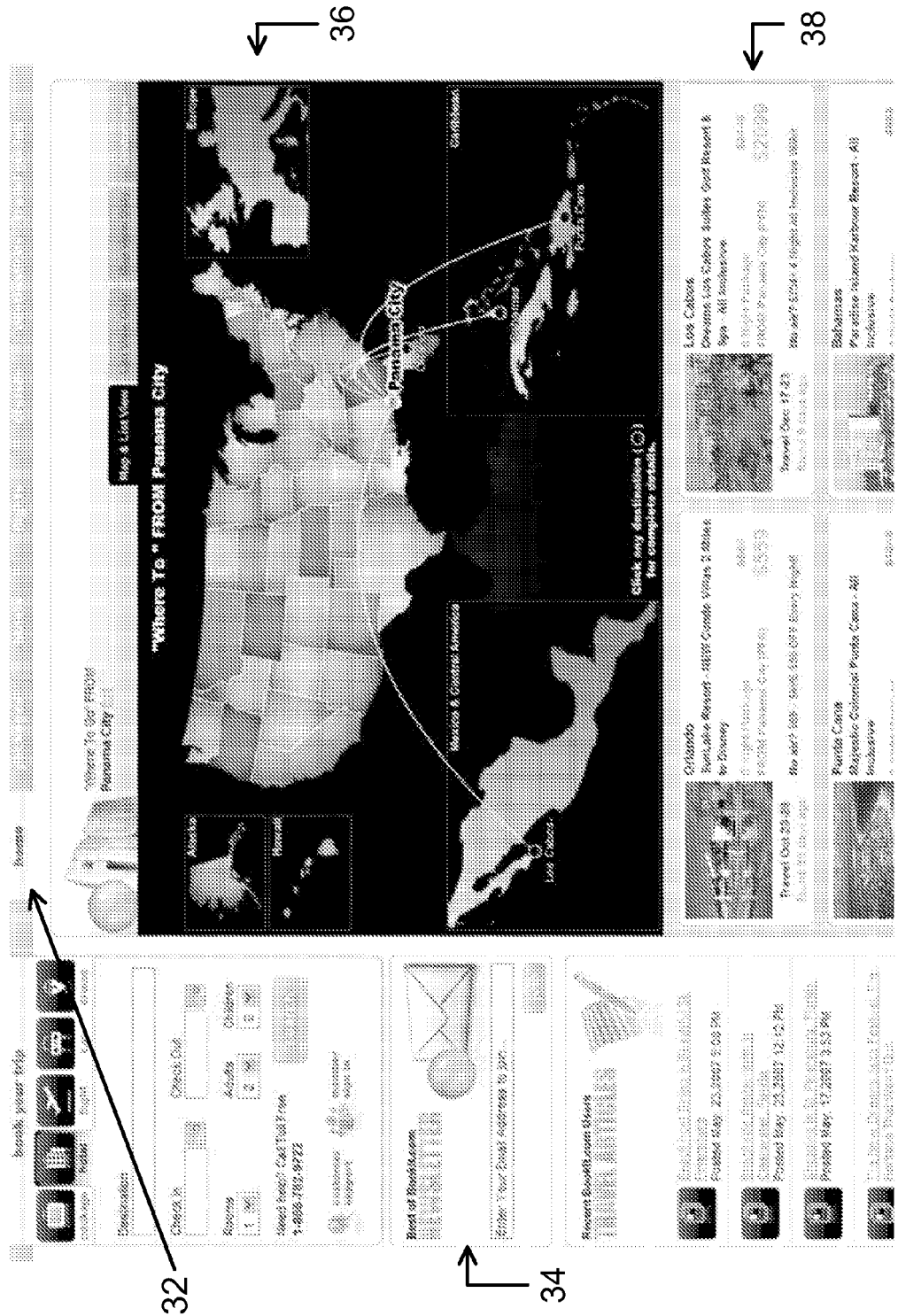
FIG. 2 shows an example of a web page delivered to a Visitor.

Now referring to FIG. 2 where an example of a web page displayed to a Visitor is shown and includes, inter alia, a frame 32, a frame 34, a frame 36 and a frame 38. FIG. 2 is essentially a screen shot of what a Visitor in or near Panama City, Fla. would see as a result of visiting a Vendor's web site. If the Visitor was physically located in a different location the web page may be different to reflect where the Visitor was.

In the example shown in FIG. 2 said frame 32 is a navigation bar that permits a Visitor to navigate to other areas of the Vendor's website. Frame 34 is an example of information that would be displayed to all visitors regardless of where they are physically located. Frame 34 may include, for example, a search feature, broad interest information or any other information that is likely to interest Visitors from a variety of physical locations. Frame 32 and frame 34 are part of the web site template described in step 26 in FIG. 1 and is included in all web pages as generated in step 26.

Still referring to FIG. 2, frame 36 is shown to include in this example, inter alia, a graphical representation of locations that a Visitor may potentially wish to travel. In this example the Visitor is geographically located in or near Panama City, Fla. The application has returned results of several possible destinations that a Visitor in Panama City may wish to travel. The possible destinations may be depicted graphically as arcs originating in Panama City and radiating to each of the several suggested possible destinations. Frame 38 shows a detail of the suggested possible destinations shown in frame 36 and invites the Visitor to obtain more information about the destination and make a purchase.

Of course, the example shown in FIG. 2 is but one of many possible layouts of a web page generated in step 26 of FIG. 1. Besides the dynamic content shown in frame 36 and frame 38 based on the physical location of the Visitor, frame 32 and frame 34 may change as styles and customs change. There could be more frames, less frames, no frames or any other layout to show at least some content geographically relevant to the Visitor based on the Visitor's location.

In an embodiment of the invention if the Visitor's IP address is unable to be matched to a physical location or the Application determined the Visitor's location in error the Visitor may manually select the correct travel origination location. Likewise if for any reason the Visitor wishes to view travel products originating at any location the Visitor may manually select that travel origination location.

In an embodiment of the invention the application saves a cookie on the Visitor's computer or a session on the Vendor's server to retain additional information about a Visitor's preferences so that in subsequent visits to the Vendor's website the Visitor's past selections are known to provide more relevant and accurate information to the Visitor.

Figure 3:
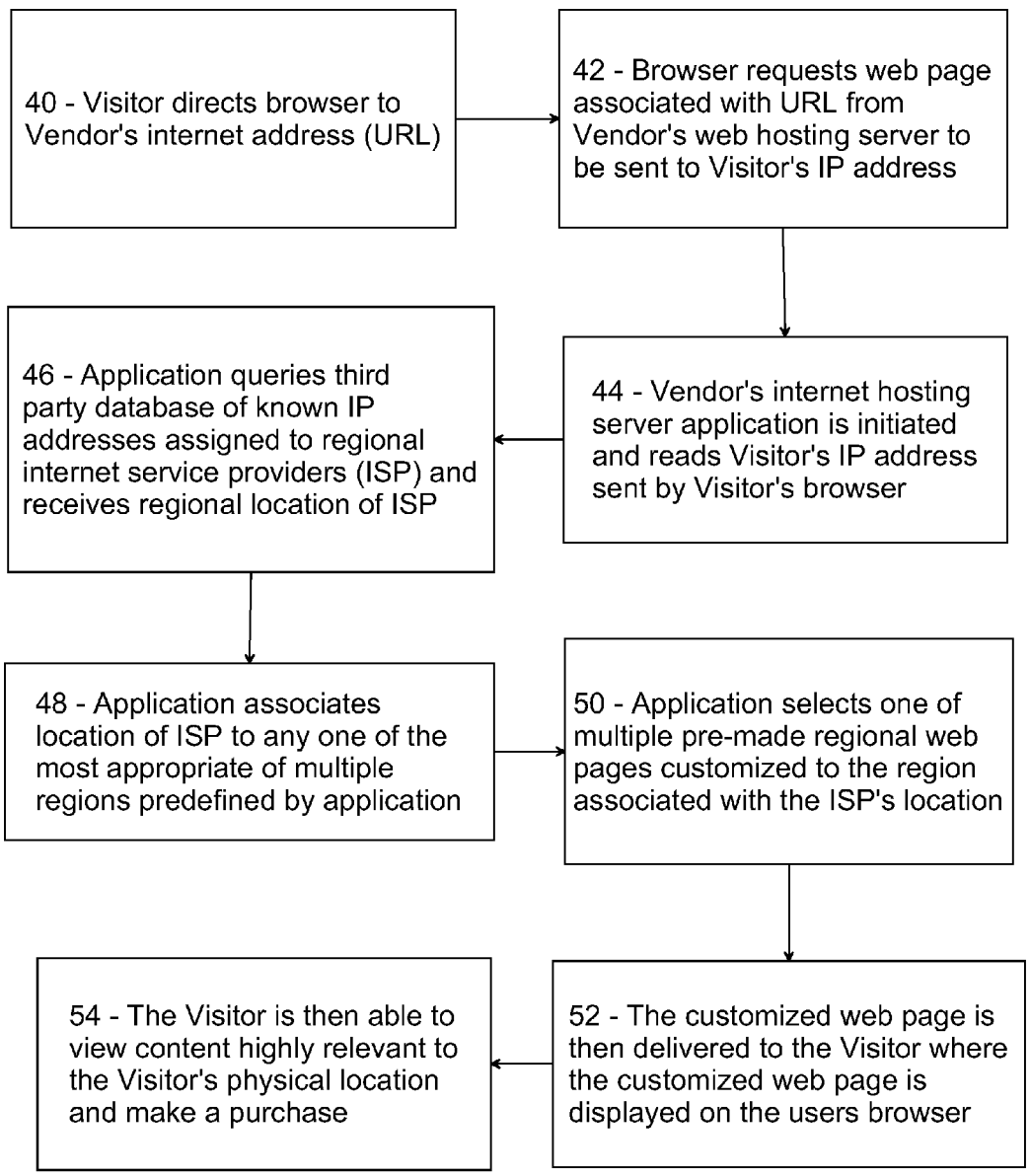
FIG. 3 illustrates a flow chart of software processes as applied to retail goods or services.

Now referring to FIG. 3 where an example of software to provide geographically relevant web site content as it may be applied to Vendors providing goods or services other than in the travel industry as described above. In step 40 a Visitor who is also a potential purchaser of the type of goods or services provided by a Vendor directs her computer to the web site of the Vendor. As is common, the Visitor can search with a third party search engine or directly enter the Vendor's URL into the address bar of her browser.

In step 42 the browser sends a request for the Vendor's web page to the Vendor's web hosting server to return the Vendor's web page the Visitors IP address.

Instead of simply returning a pre-designed static web page to the Visitor as does the prior art, as shown in step 44 an application on the server side of the internet connection is initiated and receives the Visitor's IP address and stores it into memory.

There are in existence and available to the public, sometimes as a fee based service, databases that catalog and index various information about internet service providers (ISP). Each ISP has a range of IP addresses that it assigns to its customers. Each ISP is also identified as servicing a specific region, for example a state, county or metropolitan area. Therefore, if an IP address is known the database can be searched to match the IP address to a likely physical location where the specific IP address is assigned based on the location of the ISP.

As shown in step 46 the application over the internet queries a third-party database of IP addresses to match the IP address of the Visitor to an ISP. The ISP is typically reported as servicing a limited geographical area and therefore the likely physical location of the Visitor, based on the Visitor's IP address, is estimated.

In step 48 the application then matches the estimated physical location of the Visitor with any of several pre-defined geographic regions. For example, if a Vendor primarily only services the United States the geographic regions could be defined as mid-west states, western states, north-east states, south-east states, south-west states and north-west states. Another example may be that each state is its own geographic region. Another example may be each city with a population over a certain size is surrounded by a predefined region. Of course, the predefined geographic regions can be customized to suit a particular Vendor's requirements to be as large or small as desired.

Once a Visitor is matched to a predefined geographic region a pre-made website corresponding to that region is selected in step 50 and sent to the Visitors IP address where it is displayed on the Visitor's computer screen in step 52. The Visitor in step 54 is then able to view content relevant to their physical location and make a purchase.

In an embodiment of the invention if the Visitor's IP address is unable to be matched to a physical location or the application determined the Visitor's location in error the Visitor may manually select the correct region.

In an embodiment of the invention a web site cookie is placed on the Visitor's computer when they visit a Vendor's web site. The cookie may contain information related to, inter alia, what a Visitor viewed while on the Vendor's web site. Presumably, what a Visitor views is of particular interest to that Visitor. On subsequent visits to the Vendor's web site can then rank similar products higher.

In an embodiment at step 50 the filter may rank results delivered to a Visitor based at least in part on what other Visitors of the web site in a similar geographical location viewed. Presumably, what other similarly located Visitors viewed may be of increased interest to other Visitors. This embodiment may optionally track trends from day to day as to what Visitors from a particular location are interested. A web page more suited to recent viewing trends may then be provided to the Visitor.

An example of the software as shown in FIG. 3 may be when a Visitor directs their computer to go to a popular chain of hardware stores. The Visitor's IP address is indicated to be originating from Chicago, Ill. If the time of year is January the hardware store may want to rank higher snow shovels to display to the Visitor. On the same day the same hardware store chain may prefer to show lawn furniture to a Visitor from Miami, Fla. without needlessly showing snow shovels to this Visitor. Therefore, it can be appreciated that geographically relevant web site content can be selected to offer more relevant products or service to Visitors based on where they are physically located.

The present invention is a computer based system for providing geographically relevant Internet content to a website visitor comprising an application on a server of a website that reads the IP address of a visitor to said website. Said application queries the website visitor's IP address against a first database of IP addresses with known geographic locations and determines a physical geographic regional location estimated to be that of the visitor. Said application selects a preferred departure point from a set of predetermined departure points based on the physical geographic region estimated to be that of the website visitor. Said application queries a second database of travel products and receives a set of preferred travel products that originate at said preferred departure point. Said application applies a filter and a ranking algorithm to the set of preferred travel products resulting in a set of selected travel products. Said application compiles a web page incorporating said set of selected travel products and delivers said web page to the website visitor.

In an embodiment said preferred departure point may be an airport, bus station, sea port or train station. In another embodiment said ranking algorithm removes travel products unlikely to be purchased by the website visitor from said set of preferred travel products. In another embodiment said filter removes travel products unlikely to be purchased by the website visitor from said set of preferred travel products. In another embodiment said application selects two, three, four, five or six preferred departure points and delivers preferred travel products originating at any of said preferred departure points.

Another embodiment of the invention is computer based system for providing geographically relevant internet content to a website visitor comprising an application on a server of a website that reads the IP address of a website visitor. Said application queries the website visitor's IP address against a database of IP addresses with known geographic locations and determines a physical geographic regional location estimated to be that of the website visitor. Said application selects a preferred region from a set of predetermined region based on the physical geographic region estimated to be that of the website visitor. Said application selects a pre-made web page that most appropriately matches the selected preferred region and delivers said web page to the website visitor. Optionally, said application further selects a pre-made web page based on prior purchases made by other visitors from a similar geographic region as the present visitor.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for presenting geographically relevant content, comprising:
    reading a remote internet protocol address of a user computing device based on an initial request for content from the user computing device, wherein the internet protocol address is read by a server-side application that is initiated in response to receiving the request for content;
    determining, by utilizing instructions stored in memory and executed by a processor and by utilizing the server-side application, a primary home airport based on the internet protocol address of the user computing device, wherein the primary home airport is determined by matching the internet protocol address of the user computing device to a physical location where the internet protocol address is assigned, wherein the physical location is assigned based on a regional location of an internet service provider;
    associating the regional location of the internet service provider to the primary home airport;
    identifying, by utilizing the instructions stored in the memory and executed by the processor, a highest ranked preferred flight and hotel package from among a plurality of available flight and hotel packages having flights originating at the primary home airport by obtaining travel packages from among the plurality of available flight and hotel packages that have destinations likely to be popular for a particular geographic region associated with the internet protocol address, wherein the plurality of available flight and hotel packages having flights originating at the primary home airport are ranked, in part, based on a review and based on a conversion rate for each flight and hotel package in the plurality of available flight and hotel packages, wherein the review is assigned a lower weight than the conversion rate when determining the highest ranked preferred flight and hotel package;
    graphically representing visual representations of locations corresponding to the ranked plurality of available flight and hotel packages that have destinations likely to be popular for the particular geographic region associated with the internet protocol address; and
    providing preferred flight and hotel package information associated with the preferred flight and hotel package, such that flight and hotel package content of the preferred flight and hotel package information is displayed, wherein no flight and hotel package information is predetermined.

2. The method of claim 1, further comprising determining the preferred flight and hotel package by identifying travel packages from among the plurality of available flight and hotel packages that have destinations with an average seasonal temperature above a predetermined value.

3. The method of claim 1, further comprising ranking preferred flight and hotel packages for display within a pre-defined area.

4. The method of claim 1, further comprising monitoring what content a user computing device views during an initial visit; and
    increasing, for a subsequent visit, product rankings of products similar to those viewed previously.

5. The method of claim 1, wherein the flight and hotel package content is selected from the group consisting of a name of an associated destination, a name of an associated resort, a picture of the associated resort and a combination thereof.

6. The method of claim 1, further comprising determining the preferred flight and hotel package based on recent viewing trends of other visitors from the particular geographic region associated with the internet protocol address.

7. The method of claim 1, further comprising providing information to display a map depicting the primary home airport.

8. A system for presenting geographically relevant content, comprising:
    a memory that stores instructions; and
    a processor that executes the instructions to perform operations, the operations comprising:
        reading a remote internet protocol address of a user computing device based on an initial request for content from the user computing device, wherein the internet protocol address is read by a server-side application that is initiated in response to receiving the request for content;
        determining, by utilizing the server-side application, a primary home airport based on the internet protocol address of the user computing device, wherein the primary home airport is determined by matching the internet protocol address of the user computing device to a physical location where the internet protocol address is assigned, wherein the physical location is assigned based on a regional location of an internet service provider;
        associating the regional location of the internet service provider to the primary home airport;
        identifying a highest ranked preferred flight and hotel package from among a plurality of available flight and hotel packages having flights originating at the primary home airport by obtaining travel packages from among the plurality of available flight and hotel packages that have destinations likely to be popular for a particular geographic region associated with the internet protocol address, wherein the plurality of available flight and hotel packages having flights originating at the primary home airport are ranked, in part, based on a review and based on a conversion rate for each flight and hotel package in the plurality of available flight and hotel packages, wherein the review is assigned a different weight than the conversion rate when determining the highest ranked preferred flight and hotel package;
        graphically representing visual representations of locations corresponding to the ranked plurality of available flight and hotel packages that have destinations likely to be popular for the particular geographic region associated with the internet protocol address; and providing preferred flight and hotel package information associated with the preferred flight and hotel package, such that flight and hotel package content of the preferred flight and hotel package information is displayed, wherein no flight and hotel package information is predetermined.

9. The system of claim 8, wherein the operations further comprise determining the preferred flight and hotel package by identifying travel packages from among the plurality of available flight and hotel packages that have destinations with an average seasonal temperature above a predetermined value.

10. The system of claim 8, wherein the operations further comprise ranking preferred flight and hotel packages for display within a pre-defined area.

11. The system of claim 8, wherein the operations further comprise:
monitoring what content a user computing device views during an initial visit; and
increasing, for a subsequent visit, product rankings of products similar to those viewed previously.

12. The system of claim 8, wherein the flight and hotel package content is selected from the group consisting of a name of an associated destination, a name of an associated resort, a picture of the associated resort and a combination thereof.

13. The system of claim 8, wherein the operations further comprise determining the preferred flight and hotel package based on recent viewing trends of other visitors from the particular geographic region associated with the internet protocol address.

14. The system of claim 8, wherein the operations further comprise providing information to display a map depicting the primary home airport.

15. A computer-readable device comprising instructions, which when loaded and executed by a processor, cause the processor to perform operations comprising:
reading a remote internet protocol address of a user computing device based on an initial request for content from the user computing device, wherein the internet protocol address is read by a server-side application that is initiated in response to receiving the request for content;
determining, by utilizing the server-side application, a primary home airport based on the internet protocol address of the user computing device, wherein the primary home airport is determined by matching the internet protocol address of the user computing device to a physical location where the internet protocol address is assigned, wherein the physical location is assigned based on a regional location of an internet service provider;
associating the regional location of the internet service provider to the primary home airport;
identifying a highest ranked preferred flight and hotel package from among a plurality of available flight and hotel packages having flights originating at the primary home airport by obtaining travel packages from among the plurality of available flight and hotel packages that have destinations likely to be popular for a particular geographic region associated with the internet protocol address, wherein the plurality of available flight and hotel packages having flights originating at the primary home airport are ranked, in part, based on a review and based on a conversion rate for each flight and hotel package in the plurality of available flight and hotel packages, wherein the review is assigned a lower weight than the conversion rate when determining the highest ranked preferred flight and hotel package;
graphically representing visual representations of locations corresponding to the ranked plurality of available flight and hotel packages that have destinations likely to be popular for the particular geographic region associated with the internet protocol address; and
providing preferred flight and hotel package information associated with the preferred flight and hotel package, such that flight and hotel package content of the preferred flight and hotel package information is displayed, wherein no flight and hotel package information is predetermined.

16. The computer-readable device of claim 15, wherein the operations further comprise determining the preferred flight and hotel package by identifying travel packages from among the plurality of available flight and hotel packages that have destinations with an average seasonal temperature above a predetermined value.

17. The computer-readable device of claim 15, wherein the operations further comprise ranking preferred flight and hotel packages for display within a pre-defined area.

18. The computer-readable device of claim 15, wherein the operations further comprise:
monitoring what content a user computing device views during an initial visit; and
increasing, for a subsequent visit, product rankings of products similar to those viewed previously.

19. The computer-readable device of claim 15, wherein the flight and hotel package content is selected from the group consisting of a name of an associated destination, a name of an associated resort, a picture of the associated resort and a combination thereof.

20. The computer-readable device of claim 15, wherein the operations further comprise determining the preferred flight and hotel package based on recent viewing trends of other visitors from the particular geographic region associated with the internet protocol address.

* * * * *